United States Patent
Winkler et al.

[11] Patent Number: 6,059,702
[45] Date of Patent: May 9, 2000

[54] MACHINE TOOL WITH COOLANT FLUSHING SYSTEM

[75] Inventors: Hans-Henning Winkler, Tuttlingen; Anton Schweizer, Wurmlingen, both of Germany

[73] Assignee: Chiron-Werke GmbH & Co. KG

[21] Appl. No.: 09/084,699

[22] Filed: May 26, 1998

[30] Foreign Application Priority Data

| May 27, 1997 | [DE] | Germany | 197 22 003 |
| Jun. 25, 1997 | [DE] | Germany | 197 26 942 |
| Apr. 18, 1998 | [EP] | European Pat. Off. | 98 107 114 |

[51] Int. Cl.[7] .............. B23Q 3/157; B23C 9/00; B23B 51/06
[52] U.S. Cl. .............. 483/13; 408/56; 409/134; 409/136; 409/137; 409/231; 451/444; 483/31
[58] Field of Search .............. 483/13, 31; 409/232, 409/231, 233, 234, 136, 137, 134; 451/444; 408/56, 59, 238

[56] References Cited

U.S. PATENT DOCUMENTS

| 4,185,376 | 1/1980 | Johnstone | 483/13 X |
| 4,525,918 | 7/1985 | Puritz | 483/13 |
| 4,759,113 | 7/1988 | Hunkeler | 483/13 |
| 4,822,218 | 4/1989 | Satoh | 409/136 |
| 4,951,578 | 8/1990 | Von Haas et al. | 409/136 |
| 5,002,442 | 3/1991 | Rutschle | 409/134 |
| 5,140,780 | 8/1992 | Lincoln | 451/444 |
| 5,660,510 | 8/1997 | Tanigochi et al. | 409/136 |
| 5,690,137 | 11/1997 | Yamada | 409/233 X |
| 5,895,182 | 4/1999 | Hayashi et al. | 409/137 |

FOREIGN PATENT DOCUMENTS

| 84 30 433 U1 | 1/1985 | Germany . | |
| 40 12 314 A1 | 10/1991 | Germany . | |
| 42 31 959 A1 | 5/1994 | Germany . | |
| 306138 | 12/1989 | Japan | 483/13 |

Primary Examiner—William Briggs
Attorney, Agent, or Firm—Cummings & Lockwood

[57] ABSTRACT

A machine tool comprises a spindle which has a tool receptacle for tool holders. Also provided are a tool changing apparatus for transferring the tool holders between their respective magazine position and a working position in the tool receptacle, and an internal cooling system which delivers coolant from a coolant supply system, through an internal duct running longitudinally through the spindle, to a tool holder clamped into the tool receptacle, in order to flush out a tool that is in use. Also provided is a flushing apparatus in order to flush the tool holder while it is being inserted into the tool receptacle, the flushing apparatus flushing with coolant from the coolant supply system.

17 Claims, 6 Drawing Sheets

MACHINE TOOL WITH COOLANT FLUSHING SYSTEM

BACKGROUND OF THE INVENTION

1. Field of the Invention

The present invention relates to a machine tool having a spindle which has a tool receptacle for tool holders; having a tool changing apparatus for transferring the tool holders between their respective magazine position and a working position in the tool receptacle; and having an internal cooling system which delivers coolant from a coolant supply system, through an internal duct running longitudinally through the spindle, to a tool holder clamped into the tool receptacle, in order to flush out a tool that is in use, a flushing apparatus being provided in order to flush the tool holder while it is being inserted into the tool receptacle.

The invention further relates to a method for operating a machine tool of this kind, regarding tool changing in particular.

2. Related Prior Art

A machine tool of the aforesaid kind is known from DE 84 34 433 U.

The known machine tool has a spindle, rotatably mounted in a spindle housing, on whose end face a receptacle for tool holders is centeredly provided.

Tool holders of this kind are usually standardized; they have a quick-release taper which is complementary in configuration to the tool receptacle in the spindle. The quick-release taper is adjoined at the bottom by a thickened shoulder on which a gripper channel is provided. Extending below the shoulder is a retaining shaft in which tools can be secured.

When the tool holder is being clamped into the spindle, the quick-release taper comes into contact with a conical inner surface of the tool receptacle, a clamping apparatus which operates in a manner known per se being provided in order to clamp the tool holder in.

The known machine tool comprises an internal cooling system having an inner duct, running longitudinally through the spindle, which opens in the region of the clamping apparatus, via a rotary distributor, into infeed conduits which run through the spindle to its end face and there come into engagement with ducts which open at the top of the thickened shoulder of the tool holder. These ducts lead through the tool holder into the tool carried by it, so as to cool and flush out said tool during operation. The internal cooling system can be switched over to compressed air in order to blow off the machined workpiece.

Also provided is a flushing apparatus which comprises eccentric ducts in a clamping bar of the clamping apparatus, said ducts communicating, via annular ducts, with a bore opening centrally into the tool receptacle. Through this system the flushing apparatus feeds a washing agent by means of which the tool receptacle can be cleaned during tool changing. Delivery of the washing agent becomes possible as a function of the axial position of the clamping bar; in the uncoupled state, a transverse bore in the clamping bar aligns with a supply bore in the housing, which in turn communicates with a washing agent source.

Physically complex features ensure that no coolant passes into the tool receptacle.

For cleaning tool holders having a quick-release or steep-angle taper, DE 40 12 314 A1 discloses a cleaning device which is inserted instead of a tool holder into the tool receptacle of the spindle, and itself has a comparable receiving space for a quick-release taper. Brushes which clean an inserted tool holder quick-release taper are provided in said receiving space, coolant which is delivered in the usual way via the quick-release taper being also used as the washing agent.

Instead of the quick-release taper mentioned above, it is also possible to provide the tool holder with tapered hollow shafts which are equipped with a top opening through which the jaw segments and the clamping bar of a clamping system engage into the interior of the tapered hollow shaft in order to draw the latter into the tool receptacle. Planar contact between the spindle and tool holder is accomplished here not primarily via the conical outer surface of the tapered hollow shaft, but by means of an upward-facing annular surface of the thickened shoulder, which comes into planar contact with a contact surface on the end surface of the spindle when the tool holder is drawn into the tool receptacle.

Extending centeredly in the clamping bar is an internal duct which is connected to an internal cooling system of the machine tool. At its lower end, the clamping jaw has a thickened clamping stem in which a bore, which is open at the bottom and into which the internal duct opens, is provided. Associated therewith and located internally in a tapered hollow shaft is a coolant tube which engages into the bore of the clamping stem when the latter enters the tapered hollow shaft as a tool holder is being clamped in. The coolant tube is equipped with an internal bore which leads to the clamped-in tool.

When the tool holder with the tapered hollow shaft is clamped into the tool receptacle, coolant can consequently pass, through the internal duct in the clamping jaw and the internal bore in the coolant tube, to the tool in order to cool the latter from inside and at the same time flush out chips.

In the case of the known machine tool, a sleeve surrounding the spindle is provided on the spindle housing and can be displaced relative to the longitudinal axis of the spindle. Arranged on the sleeve is a tool changing apparatus which comprises a number of tool changers, each of which carries a tool holder as described above. Each tool changer is fitted with a gripper hand which grasps the tool holder at the gripper channel. The gripper handle is in turn mounted on two gripper arms which constitute a parallelogram mechanism. One of the gripper arms is connected to a drive unit made up of a cylinder and piston rod; extension and retraction of the piston rod transfers the gripper hand, and thus the tool holder carried by it, from the magazine position into the working position in the spindle, or from the working position back into the magazine position. By means of a longitudinal shifting of the sleeve and thus of the tool changer with respect to the spindle, the quick-release taper or the tapered hollow shaft is inserted into the tool receptacle or drawn back out of it.

In the magazine position, the tool holders are introduced with their quick-release tapers or tapered hollow shafts into sheaths which protect the tool holders from contamination.

It is known that during machining of a workpiece with the tool that is carried by the respective tool holder clamped into the tool receptacle of the spindle, in the case of the machine tool described thus far, the working area is flushed with coolant in order on the one hand to cool the workpiece and on the other hand to flush out from the working region of the particular tool the chips created during machining, and also to remove chips from the tool and its tool holder. As is commonly known, this flushing occurs in the region of the spindle only during machining of the workpiece; for obvious reasons, no flushing is necessary during tool changing.

To assist this "external flushing," the aforesaid internal cooling system is also provided in the case of the machine tool mentioned at the outset; this cools the tool from inside in order to prevent overheating and the problems associated therewith involving the tool that is in engagement. This internal cooling system is, for obvious reasons, activated only when the tool is in use.

It has now been found that, apparently because of insufficient external flushing, chips nevertheless remain attached to the quick-release taper or tapered hollow shaft, and when the particular tool holder is in the magazine position, dry onto the external conical surface and/or onto the annular surface of the thickened shoulder. The next time a tool holder soiled in this fashion is clamped into the tool receptacle, errors in planar contact occur, in particular with tool holders having a tapered hollow shaft, so that the tool is not clamped in centeredly and in alignment with the spindle axis.

For these reasons it is necessary, particularly in the case of tool holders having a tapered hollow shaft, to perform maintenance tasks relatively frequently in order to prevent machining errors caused by tool holders that are not correctly clamped in due to contamination with chips. In addition, tool holders and spindles must be replaced relatively often because the chips remaining on the tool holder press into the contact surface, which over the long term prevents positionally accurate clamping of the tool holders even if the contact surfaces are later free of chips once again.

Such problems have already been known for some time in the art. There are, for example, machine tools in which air is delivered through a bore in the longitudinal axis of the spindle in order to blow out the tool receptacle before a new quick-release taper is engaged. In this connection, DE 33 20 873 A1 discloses a blow-out arrangement in which the tool receptacle of the spindle can be blown out while the spindle is in any rotary position. For this, an annular channel, from which ducts run transversely through the spindle into the tool receptacle, is provided in the spindle. An associated annular channel which is supplied from outside with compressed air is provided in the spindle housing. As a result, compressed air passes from outside through the two annular channels and the transverse bore into the upper region of the tool receptacle above the internal tapered surface.

A comparable design is known from EP 0 417 549 B1, but in this the duct opens into the upper third of the internal tapered surface.

DE 26 32 228 A1 also discloses a comparable design, but here multiple ducts, distributed over the circumference, open into the tapered surface, specifically at its lower end. The ducts extend obliquely downward and inward toward the spindle axis; as a result of this oblique arrangement, not only is the tool receptacle to be blown out, but the quick-release taper is also to be blown off. The slope of the ducts is selected so that the quick-release taper is blown off well before reaching the opening of the tool receptacle, so that the blown-off chips cannot get into the tool receptacle.

With all three of the machine tools so far described, compressed air is fed laterally through the spindle housing and from there, via a corresponding arrangement of ducts and annular channels, into the spindle. All the machine tools are designed for use with tool holders having a quick-release taper, and require a separate compressed air supply which must be correspondingly activated when a tool holder is engaged or clamped in.

In this context, the air supply that must be separately controlled and made available constitutes an additional cost factor and requires additional design outlay, which is generally disadvantageous. It has furthermore been found that this blowing-off process is in some cases not effective enough: chips still remain adhering to the tool holder, especially if they are, in a manner of speaking, glued there by dried-on coolant.

SUMMARY OF THE INVENTION

In view of the above, it is an object of the present invention to improve the machine tool mentioned at the outset in such a way that more effective removal of chips from the tool holder is achieved by means of a simple design.

In the case of the machine tool mentioned at the outset, this object is achieved, according to the invention, in that the flushing apparatus flushes the tool holder with coolant from the coolant supply system.

According to the invention this object is also achieved, in the case of the method mentioned at the outset, in that the internal cooling system is activated during transfer of a tool holder into the working position, so as to flush the tool receptacle and/or the tool holder with coolant through the internal duct.

The object underlying the invention is completely achieved in this manner. With regard to the new method, the inventors of the present invention have recognized that flushing of the tool holder with coolant during engagement yields a significant advantage as compared with blowing off with compressed air, despite the greater consumption of coolant. The reason is that the coolant detaches the dried-on chips so that the dried coolant releases the chips adhering to it. This would not be possible simply by blowing off with compressed air.

A further advantage is the fact that the control system for the internal cooling system, which is present in any case on the known machine tool, can be used to effect flushing during engagement. The known machine tool thus requires no change in design in order to achieve effective removal of chips. This flushing, however, does not simply remove chips from the tool holder located under the tool receptacle at the time; rather the tool receptacle is also cleaned internally as a result of the high pressure at which the coolant is delivered. This is because the coolant emerges at the bottom of the clamping stem and is partly reflected from the tool holder back into the tool receptacle, where it removes any adhering chips.

It was hitherto known from the art only to clean tool holders with compressed air or with special washing agents. Coolant was used only in conjunction with the use of brushes, which also led to features of complex design. Provision was always made, however, to ensure that no coolant entered the actual tool receptacle of the spindle. The inventors of the present application were the first to recognize that the coolant is an efficient washing agent even if no brushes are used.

The inventors of the present application have thus recognized that, surprisingly, flushing at the very last moment before insertion, i.e., so to speak, a kind of "final cleaning" of the quick-release taper and/or of the planar contact, makes it possible to clamp the tool holder in place reproducibly and without disruptive chips, etc., specifically because the coolant remaining behind on, for example, the annular surface unexpectedly does not interfere with engagement. In other words, it is not necessary for the tool holder to be dry in the region of the contact surfaces with the spindle or its end surface.

The additional coolant consumption for additional flushing shortly before insertion, which is in itself negative, thus nevertheless offers great advantages; specifically, the flushing of the quick-release taper or planar contact that is achieved allows the tool holder, and thus the tool held by it, to seat accurately and reproducibly.

In an improvement, it is preferred if the flushing apparatus comprises nozzles which predominantly act tangentially to the tool holder, which in controlled fashion flush the tool holder on its annular surface, preferably predominantly in parallel fashion.

The advantage here is that any chips present on the annular surface are prevented from being sprayed up onto the quick-release taper or into the tool receptacle. The nozzles, operating tangentially to the tool holder (i.e. to its quick-release taper), thus spray off the enveloping surface and annular surface laterally; the predominantly parallel orientation which is also preferably present prevents any upward flushing or spraying due to bouncing off the annular surface. In other words, this arrangement of the nozzles on the one hand results in effective flushing of the tool holder, and on the other hand effectively prevents recontamination of the tool receptacle.

It is preferred in this context if the machine tool comprises an internal cooling system which, during operation, flushes out a tool that is in use, through the spindle and the tool holder, with coolant from a coolant supply system; and if a switchover apparatus is provided which switches the coolant supply system selectably over from the internal cooling system to the flushing apparatus.

This feature is advantageous in terms of design: the internal cooling system which is present in any case, and with which the tool is cooled and flushed during machining, is switched over during the tool change to the flushing apparatus, by means of which the tool holder is then flushed as it is inserted.

It is further preferred in this context if the nozzles are arranged on the tool changing apparatus.

The advantage here is that the nozzles accompany the movements of the spindle, so there is no need to move to a particular flushing position when a tool change is taking place. It is thus possible to retain the advantage of the variable changing plane, according to which tool holders can be exchanged while the spindle is in any position, provided there are no collisions with the workpiece currently being machined.

On the other hand, it is preferred if the nozzles are arranged on the spindle housing in the region of its end surface, preferably on the end surface itself.

Here again, it is first of all advantageous in terms of design that the nozzles move concurrently, so there is no need to move to a particular flushing position and the advantages of the variable changing plane can be retained. A further advantage is the fact that the nozzles are now arranged around the tool receptacle and very close to it, so that they can easily reach the planar contact surface of the tool holder (which is actually very difficult to access for flushing operations), and flush it in particular in the tangential and parallel directions.

It is further preferred in this context if the nozzles are configured on pilot pins for the gripper hands.

This feature is also advantageous in terms of design, since the pilot pins are provided in any case on the end surface. Pilot pins of this kind ensure that the gripper hand, which remains on the tool, is laterally retained during displacement of the spindle. The reason is that without these pilot pins, the gripper hand, which is guided on a long linkage, might vibrate back and forth during the very fast displacement with sudden acceleration and deceleration, which in turn would impair machining accuracy since the vibratory movements of the gripper hand would be transferred via the tool holder to the workpiece.

These pilot pins are arranged on the end surface of the spindle housing in such a way that the gripper hand ends up between them when the tool holder is clamped into the tool receptacle. This means, however, that these pilot pins are already arranged so that no collisions occur with the gripper hand. These pilot pins, arranged in "strategically favorable" fashion, can now be used at the same time to carry the nozzles of the flushing apparatus. Said nozzles are thus provided very close to the tool holder that is being inserted, thus allowing effective flushing.

It is further preferred in this context if the pilot pins each have an axially extending delivery bore and a nozzle bore oriented predominantly tangentially or transversely.

This feature is advantageous in terms of design: the pilot pins simply need to be equipped with one central and one lateral bore, and the receiving bore or receiving insertion hole for the pilot pins in the end surface of the spindle housing then needs to be connected to the flushing apparatus via appropriate conduits.

It is preferred in this context if the nozzles are interconnected via an annular conduit.

It is additionally advantageous here that multiple nozzles can easily be provided in the flushing apparatus and interconnected.

A further increase in efficiency is achieved by the fact that at least one flushing duct, whose at least one outlet opening is arranged in the region of the tool receptacle, branches off from the top of the internal duct; the machine tool thus has, in a manner of speaking, a bypass, so that coolant can also be passed through the flushing duct by the internal cooling system during insertion; the outlet opening can be placed suitably so that, in a manner of speaking, there is a double coolant action on the tool changer being inserted. The outlet opening can, for example, be located in the spindle housing alongside the tool receptacle.

The higher coolant consumption that occurs because of the activation (possibly only briefly) of the internal cooling system while a tool holder is being transferred into its working position is more than compensated for by the longer service lives which now result for the tool receptacle and tool holders, since the latter are no longer damaged by adhering chips. A further advantage of the new method and of the new machine tool is, of course, the fact that because the chips are effectively removed, very accurate planar contact is achieved, thus considerably increasing machining accuracy so that maintenance intervals can be extended.

In an improvement of the new machine tool, it is preferred if the flushing duct extends in the spindle, the outlet opening preferably being located in an end face of the spindle.

The advantage here is that the sealing problems between the spindle housing and the rotatable spindle that are known, in the case of compressed air, from the existing art are avoided. In addition, this arrangement is of very simple design: all that is necessary is to drill the internal duct laterally into the spindle and then guide said duct downward to the end face of the spindle. In the simplest case, therefore, only two bores are necessary in order to make the bypass possible. Of course many flushing ducts can be provided, equally distributed circumferentially, in the spindle, so that a corresponding number of outlet openings is arranged around the tool receptacle. As the tool holder is being inserted, the flushing streams which emerge there then strike both the external taper surface and the thickened shoulder.

It is preferred in this context if the tool receptacle is designed for tool holders with a hollow-shaft taper (HSK), a contact surface being provided on the end face and, when the HSK tool holder is clamped into the tool receptacle, being in planar contact with its annular surface, so that the HSK tool holder is positioned accurately; and if the outlet opening is located in the contact surface.

The advantage here is that on the one hand, targeted flushing of the annular surface and, by means of sprayed-back coolant, of the contact surface as well, is possible. In addition, the various outlet openings are, in a manner of speaking, automatically closed off when the contact surface and the annular surface are in planar contact with one another. This ensures that the bypass is closed when the internal cooling system is later used, so that the coolant pressure is sufficient to force coolant through the tool. Since the position of an HSK tool holder is determined by planar contact between the contact surface and annular surface, the aforesaid embodiment of the new machine tool allows effective removal of chips at the specific point where they would be particularly troublesome.

It is further preferred if there is provided in the spindle, for automatic clamping in of tool holders, a clamping apparatus which comprises a clamping bar, arranged in longitudinally displaceable fashion coaxially with the spindle in an internal bore, through which the internal duct passes in the longitudinal direction and which comes into engagement with a coolant tube of a tool holder when the latter is clamped in, so that it is supplied with coolant through the internal duct.

Using a simple design, this feature combines the internal cooling system, known per se, using transfer via a coolant tube to the tool to be cooled, with the bypass resulting from the flushing duct. A further advantage is the fact that during clamping in, i.e. when the coolant tube engages into the clamping bar, an increasing counterpressure is gradually built up there as a result of the small bores in the tool into which the coolant is forced. Because of this counterpressure, more and more coolant is now expelled at higher and higher pressure out of the outlet openings, thus resulting in an increasingly strong and therefore highly effective flushing of both the annular surface and the contact surface, until the outlet openings are closed off when planar contact occurs between the contact surface and annular surface.

In an improvement, it is preferred if there is provided in the clamping bar at least one transverse bore which opens into the internal duct and coacts with a transfer space, provided in the spindle and open toward the internal bore, into which the flushing duct opens, the transfer space preferably being an annular space which extends around the clamping bar, seals which sit between the clamping bar and the spindle furthermore being provided preferably above and below the annular space in the internal bore.

These features are advantageous in terms of design since they allow easy transfer of the coolant from the longitudinally displaceable clamping bar into the flushing ducts proceeding radially with respect to the clamping bar, the two seals yielding simple sealing at the top and bottom. Said seals do not interfere with the function of the clamping apparatus, since during a tool change the clamping bar is simply moved a certain linear distance downward in order to release the tool that is currently clamped in, and is then drawn back by that same linear distance when the new tool is clamped in.

It is further preferred if the distance between the two seals in the longitudinal direction of the clamping bar is greater than a linear distance to be traveled by the clamping bar when clamping in a tool holder.

The advantage here is that the internal duct can communicate with the flushing duct during the entire linear travel of the clamping bar, so that during the entire operation of clamping in a new tool holder, the latter can be flushed with coolant both via the internal duct and via the flushing duct.

On the other hand, it is preferred if the clamping bar is surrounded by an axially nondisplaceable shaped sleeve in which a transverse bore, which is connected to the flushing duct and with which the transverse bore in the clamping bar communicates as a function of the latter's axial position, is provided.

The advantage here is that the flushing apparatus is, so to speak, automatically activated and deactivated when the clamping bar is displaced. The two transverse bores communicate with one another when the clamping bar is extended, so that when the internal cooling system is activated, coolant passes from the internal duct into the flushing ducts.

In general, it is also preferred if a nonreturn valve is provided in the internal duct.

The advantage here is that discharge occurs through the internal duct itself, i.e. centeredly out of the tool receptacle, at an adjustable pressure, while at lower pressure discharge takes place only via the bypass.

Further advantages are evident from the description and the appended drawings. It is understood that the features mentioned above and those yet to be explained below can be used not only in the respective combinations indicated, but also in other combinations or in isolation, without leaving the context of the present invention.

BRIEF DESCRIPTION OF THE DRAWINGS

Embodiments of the invention are shown in the drawings and will be explained in more detail in the description below. In the drawings.

DETAILED DESCRIPTION OF PREFERRED EMBODIMENTS

Figure 1:
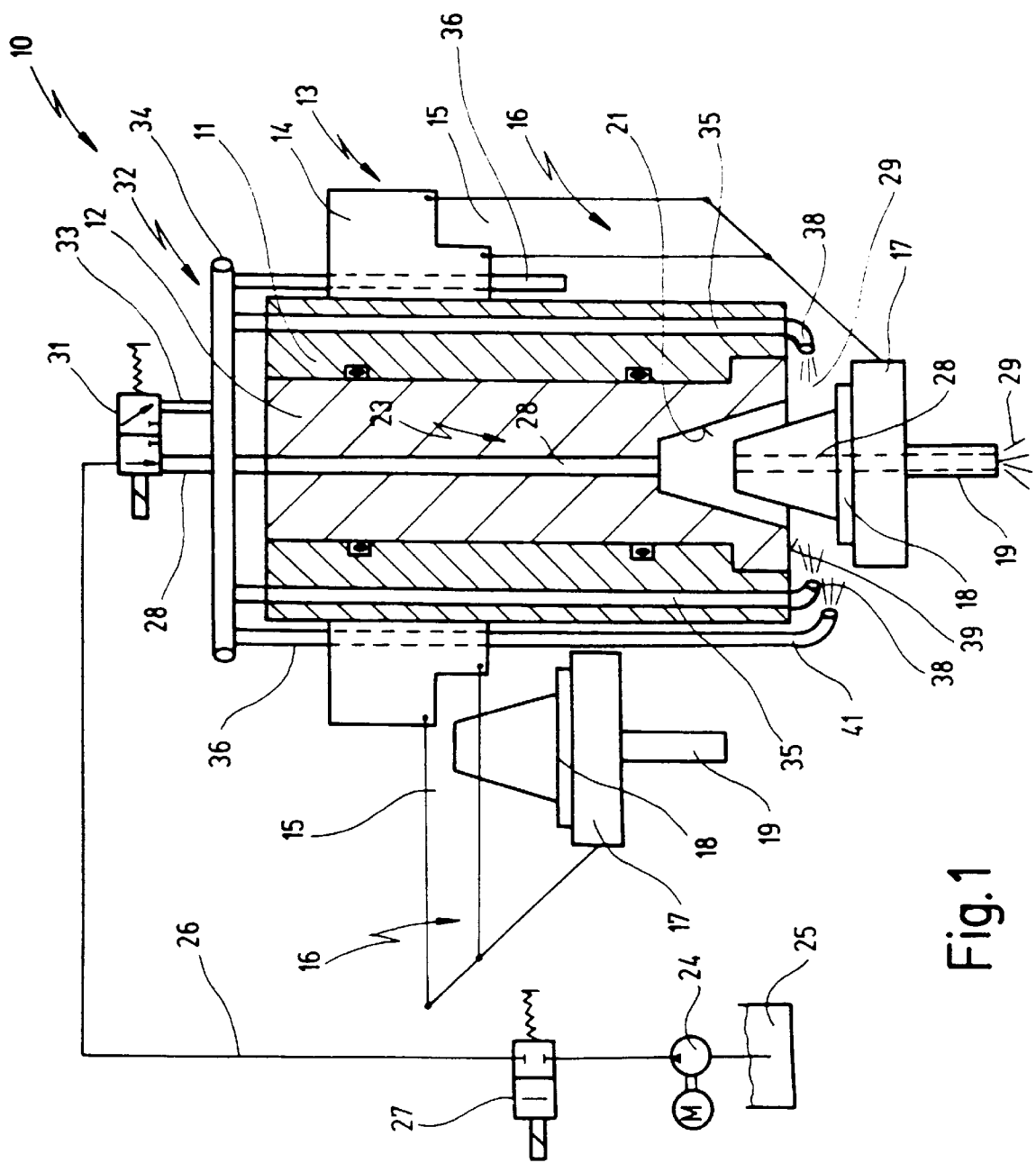
FIG. 1 shows a schematic longitudinal section through a new machine tool, in which nozzles of a flushing apparatus are arranged on the tool changing apparatus.

Shown schematically in FIG. 1, in a first embodiment, is a machine tool 10 which has a spindle housing 11 in which a spindle 12 is rotatably mounted.

Machine tool 10 has a tool changing apparatus 13 which comprises a changer cage 14, arranged in vertically displaceable fashion on spindle housing 11, that is also called a sleeve. Provided on changer cage 14 are multiple tool changers 15, two of which are shown in FIG. 1.

Each tool changer 15 comprises a parallelogram linkage 16 which carries a gripper hand 17. Arranged in each gripper hand 17 is a tool holder 18 on which a tool 19, which is shown only schematically in each case, is attached.

The left-hand tool changer 15 in FIG. 1 has pivoted tool holder 18 carried by it up into its magazine position, while the right-hand tool changer 15 has pivoted tool holder 18 held by it into its working position, in which it is just being clamped into a tool receptacle 21 in spindle 12. Tool holders 18 of this kind can be quick-release taper tool holders or hollow-shaft taper tool holders, for which suitable clamping apparatuses, which are known per se, are respectively provided in spindle 12.

Be it also noted that parallelogram linkages 16 are configured, again in a manner known per se, in such a way that as tool holders 18 are being transferred from their magazine position into the working position, they remain oriented substantially with their axes vertical.

Provided in machine tool 10 as described so far is an internal cooling system 23 which comprises a pump 24 which pumps coolant from a coolant reservoir 25 through a supply conduit 26 to machine tool 10. Also provided in supply conduit 26 is a sliding shutoff valve 27.

Supply conduit 26 transitions into a conduit 28 that extends through spindle 12 and tool holder 18 into tool 19 and flushes and cools the latter during operation, coolant emerging at its tip as indicated at 29.

Provided between supply conduit 26 and conduit 28 is a switchover apparatus 31 which connects supply conduit 26 selectably to conduit 28 or to a flushing apparatus indicated at 32. Flushing apparatus 32 comprises a conduit 33 which is connected to an annular conduit 34. Annular conduit 34 is connected to multiple stub conduits 35, 36 which can be provided selectably or together, individually or multiply.

Stub conduit 35 ends in a nozzle 38 which is provided in an end surface 39 of spindle housing 11, while stub conduit 36 is connected to a nozzle 41 which is attached to changer cage 14. Nozzles 38 and/or 41 are arranged so close to tool receptacle 21 that during insertion of a tool holder 18, coolant 29 discharged from them strikes tool holder 18 directly and flushes it. For this, switchover apparatus 31 is switched so that supply conduit 26 is now connected to conduit 33 and thus, via annular conduit 34 and stub conduits 35 and 36, to nozzles 38 and/or 41.

During insertion of the tool holder, any kind of contamination is thus flushed away from the tool holder so that good and secure planar contact of tool holder 18 in tool receptacle 21 is possible.

Figure 2:
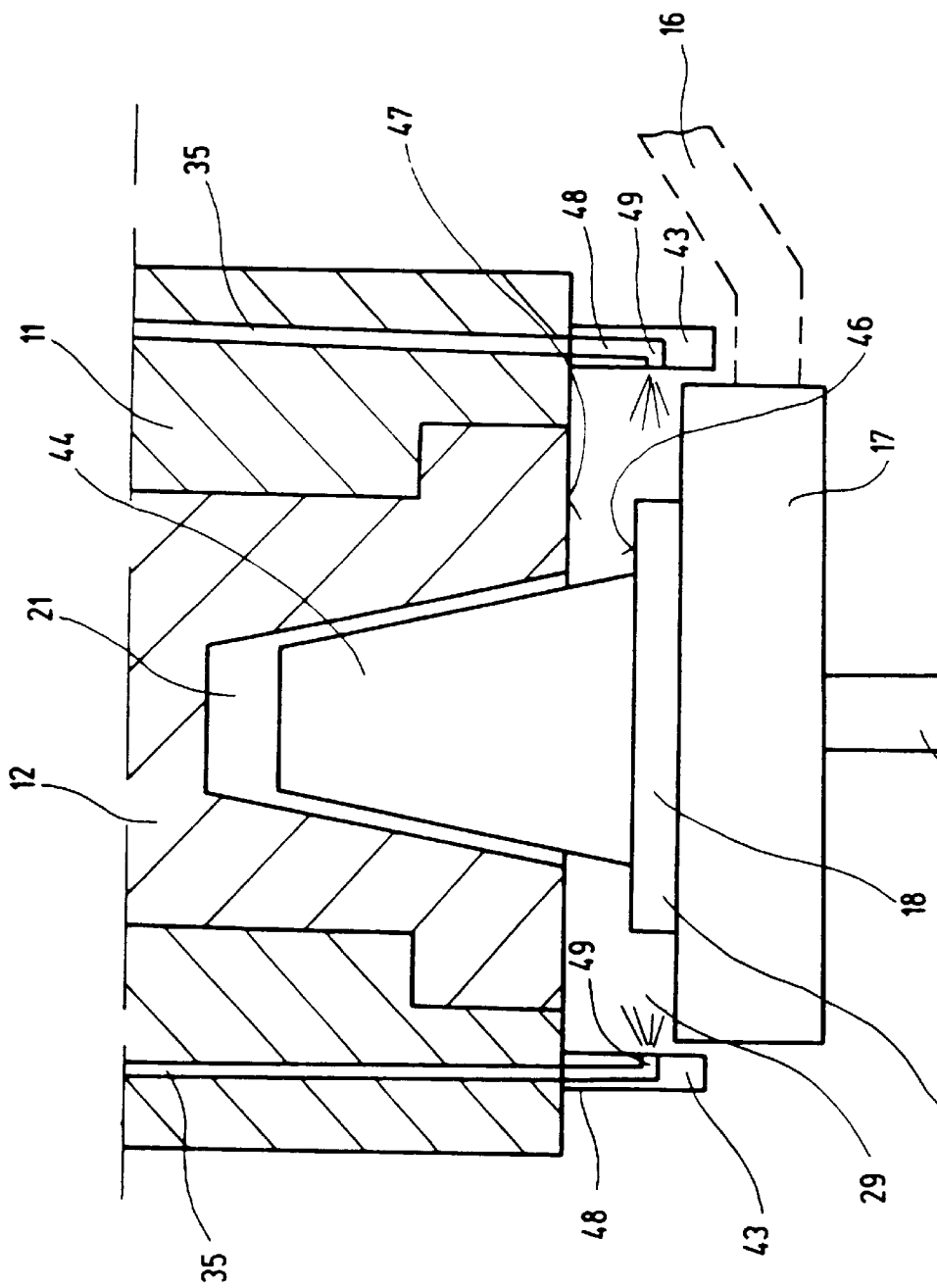
FIG. 2 shows part of the machine tool of FIG. 1 in an enlarged scale, the nozzles of the flushing apparatus being provided, in accordance with a second embodiment, on an end surface of the spindle housing.

FIG. 2 shows, in enlarged fashion, the region of tool receptacle 21 of machine tool 10 of FIG. 1, flushing apparatus 32 being shown in a second embodiment.

FIG. 2 again shows stub conduits 35 which are connected to annular conduit 34 of FIG. 1. Stub conduits 35 now end in pilot pins 43 which, when tool holder 18 is clamped in, impart a lateral retention to gripper hand 17 that persists during the machining of workpieces on tool 19 held by tool holder 18. Pilot pins 43 ensure that gripper hand 17 does not shift laterally when spindle 12 moves abruptly.

Tool holder 18 that is held, in FIG. 2, by gripper hand 17 is an HSK tool holder having a hollow-shaft taper 44 and a thickened shoulder 45 on which gripper hand 17 engages. Shoulder 45 has an annular surface 46 at which tool holder 18 comes into planar contact at an end face 47 of spindle 12. The planar contact between annular surface 46 and end face 47 effects positionally accurate alignment of tool holder 18 in spindle 12.

At least some of pilot pins 43 are equipped with an axially extending supply bore 48 which communicates with stub conduit 35. Extending perpendicular to supply bore 48 is a nozzle bore 49 through which coolant 29 is expelled from pilot pin 43. Coolant 29 strikes either hollow-shaft taper 44 or annular surface 46, depending on how far tool holder 18 has already been pushed into tool receptacle 21 during insertion.

Figure 3:
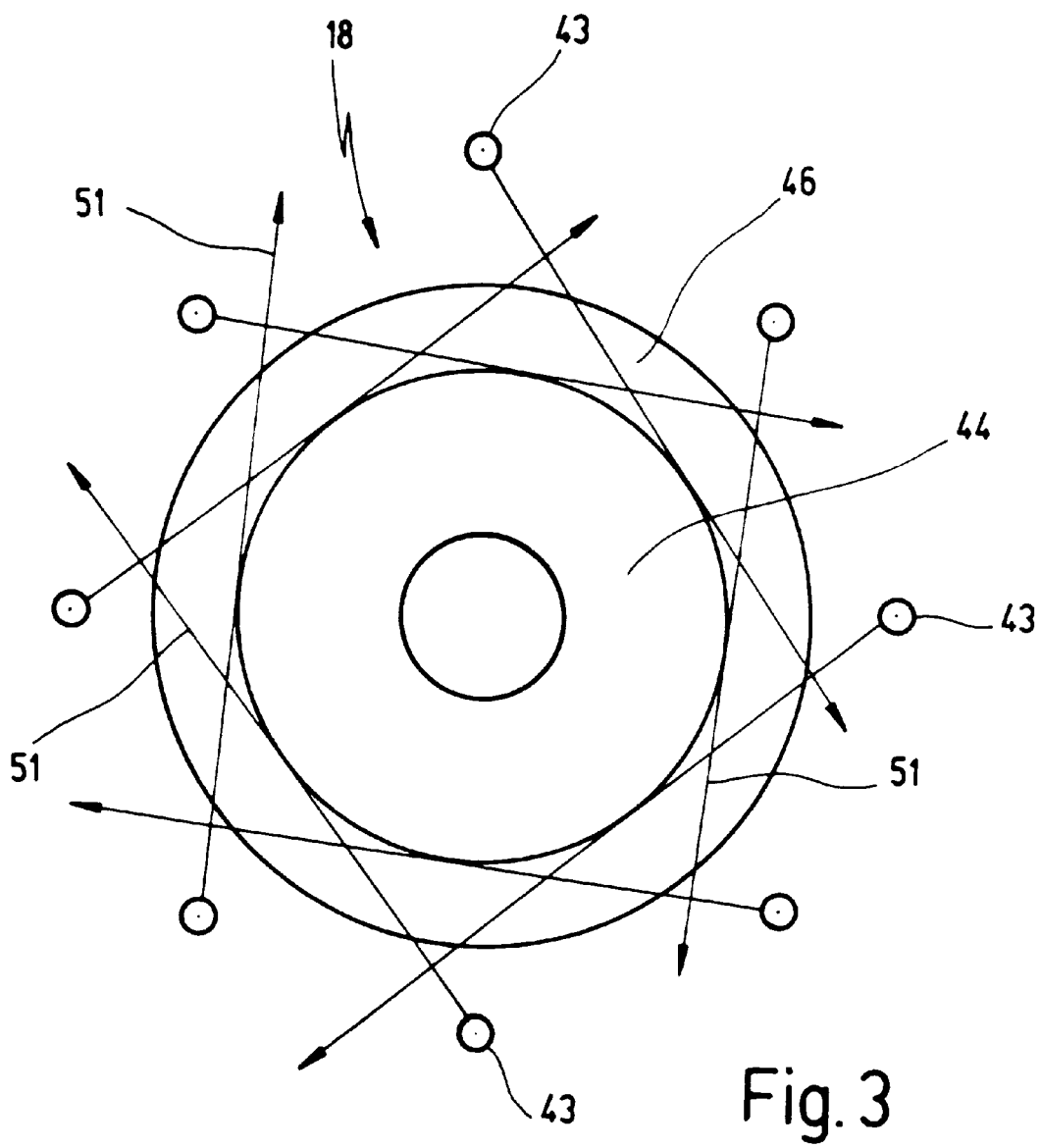
FIG. 3 shows a plan view of a tool changer, from which the direction of the flushing streams is visible.

It is evident from FIG. 3, in a plan view of tool holder 18, that nozzle bores 49 discharge flushing streams 51 which extend tangentially with respect to hollow-shaft taper 44, flushing streams 51 moreover flushing annular surface 46 approximately parallel to the latter, thus preventing flushed-off chips from being sprayed up into tool receptacle 21.

Figure 4:
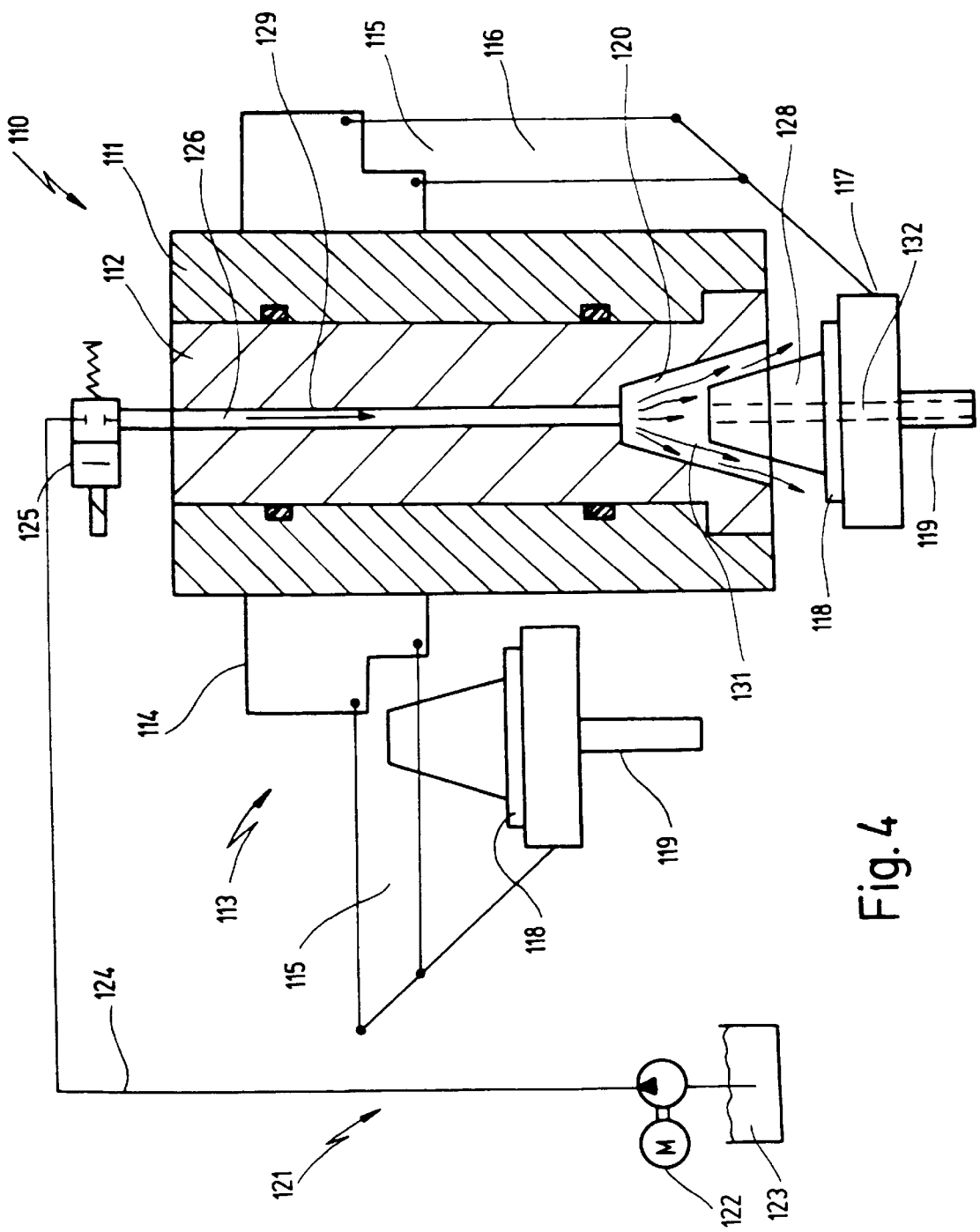
FIG. 4 shows, in a schematic side view and in longitudinal section, a machine tool on which the new method can be carried out.

FIG. 4 schematically shows a further machine tool 110 which has a spindle housing 111 in which a spindle 112 is rotatably mounted.

Machine tool 110 also comprises a tool changing apparatus 113 which comprises a changer cage 114, arranged in vertically displaceable fashion on a spindle housing 111, which is also called a sleeve. Multiple tool changers 115, two of which are shown schematically in FIG. 4, are provided on changer cage 114.

Each tool changer 115 comprises a parallelogram linkage 116 which carries a gripper hand 117. Arranged in each gripper hand 117 is a tool holder 118 on which a tool 119, shown only schematically in each case, is attached.

The left-hand tool changer 115 in FIG. 4 has pivoted tool holder 118 carried by it up into its magazine position, while the right-hand tool changer 115 has pivoted tool holder 118 held by it underneath a tool receptacle 120 which is provided centeredly in spindle 112. When sleeve 114 is then displaced upward in FIG. 4, tool holder 118 enters tool receptacle 120 and is then in its working position.

Provided in machine tool 110 as described so far is an internal cooling system 121 which comprises a pump 122 which pumps coolant from a coolant reservoir 123 through a supply conduit 124 to machine tool 110. Also arranged in supply conduit 124 is a sliding shutoff valve 125 by means of which internal cooling system 121 can be activated or deactivated.

Adjoining sliding shutoff valve 125 is an internal duct 126 which passes centeredly through spindle 112 and opens at the bottom into tool receptacle, below which in FIG. 4 sits tool holder 118 with its taper 128.

When internal cooling system 121 is then activated by actuation of sliding shutoff valve 125, coolant thus flows in the direction of an arrow 129 through internal duct 126 and emerges at the bottom as flushing stream 121, which removes externally adhering chips from taper 128 before it is clamped into tool receptacle 120.

In the embodiment shown in FIG. 4, taper 128 is an ordinary quick-release taper which is drawn, by means of clamping jaws known per se, into tool receptacle 120, which for reasons of clarity is not shown in FIG. 4. When tool holder 118 is clamped into tool receptacle 120, coolant then flows from internal duct 126 into a bore 132 of the tool holder, from whence it is then distributed, through small ducts (not shown), into tool 119 in order to cool the latter from inside during operation.

A machine tool as shown in FIG. 4 is located on the applicant's factory premises, which are not accessible to the public.

This machine tool is driven in a novel fashion upon insertion of a tool 118, in such a way that internal cooling system 121 is activated at least temporarily when a new tool holder 118 is inserted with its quick-release taper 128 into tool receptacle 120. Flushing stream 131 which is thereby created on the one hand washes tool receptacle 120 from the inside, and on the other hand flushes adhering chips away from the external surface of taper 128 and from the thickened shoulder of tool holder 118.

Figure 5:
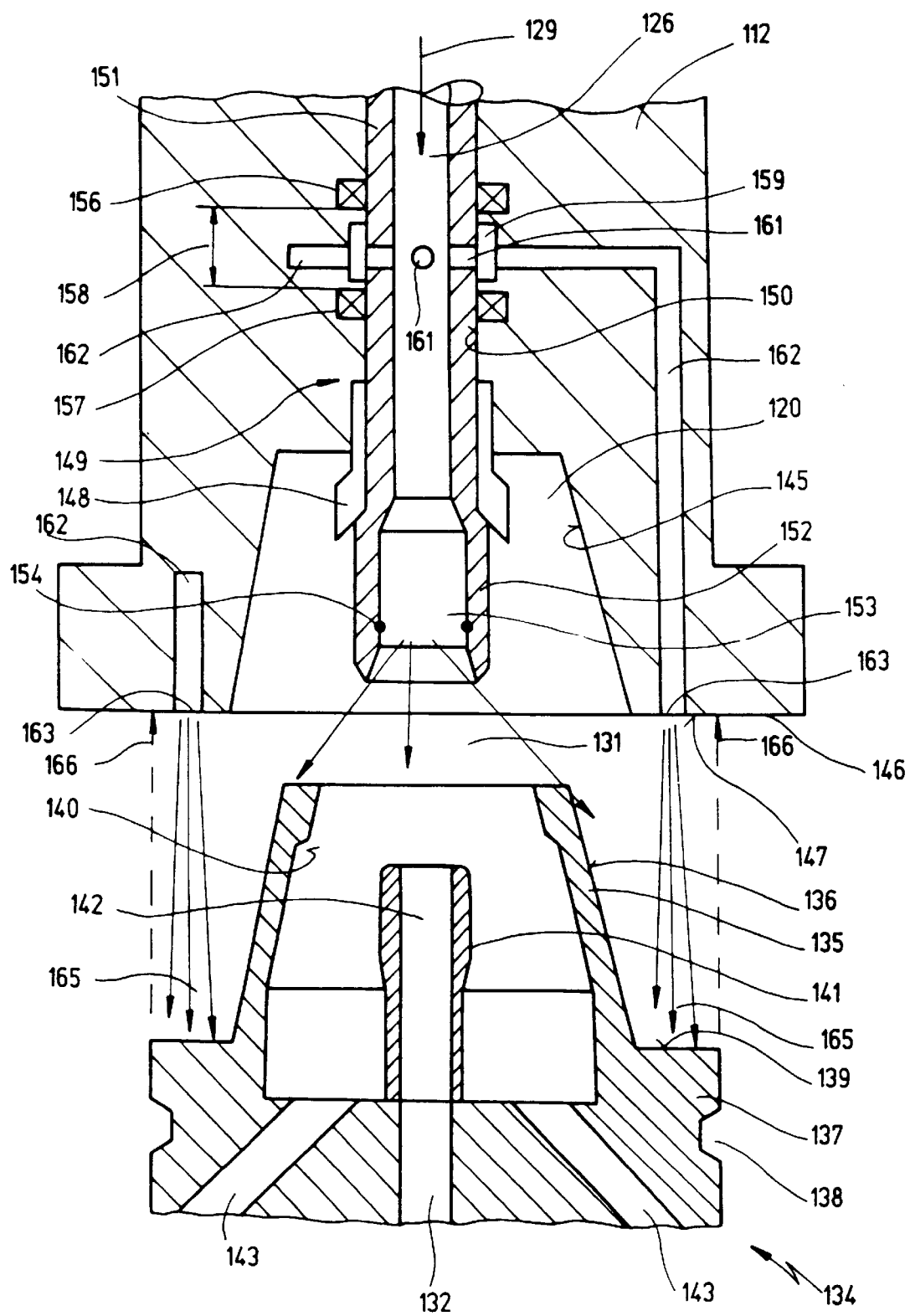
FIG. 5 shows an improvement, according to the invention, of the machine tool of FIG. 4 in the region of the spindle, the lower part of the spindle, and below it an HSK tool holder, being indicated in a schematic longitudinal section.

The embodiment according to FIG. 5 shows an improvement of the machine tool of FIG. 4, showing schematically only the lower region of spindle 112, and a hollow-shaft taper tool holder 134 arranged under spindle 112. This HSK tool holder 124 has a hollow-shaft taper 135, known per se, which possesses a conical external surface 136. Adjacent to hollow-shaft taper 135 at the bottom is a thickened shoulder 137 on which an externally peripheral gripper channel 138 is provided, on which gripper hand 117 (FIG. 4) engages in known fashion. Thickened shoulder 137 has an annular surface 139 facing upward.

In its interior, hollow-shaft taper 135 is first equipped with a buttress 140; a coolant tube 141 in which a through bore 142 extends is further provided centeredly. Through bore 142 extends into bore 132 already known from FIG. 4, which branches off to the tool. Also evident from FIG. 5 are runoff bores 143 through which coolant is discharged from the interior of hollow-shaft taper 135.

Hollow-shaft taper tool holder 134 as described so far has not yet been made accessible to the public, and in fact its development has just been completed by the applicant.

In complementary fashion to conical external surface 136, an internal tapered surface 145 is provided in tool receptacle 120. Spindle 112 moreover has at its end face 46 a contact surface 147 which comes into planar contact with annular surface 39 of thickened shoulder 137 and determines the position of HSK tool holder 134 in spindle 112 when it has been clamped in by clamping jaws 148 of an automatic clamping apparatus 149 known per se.

Clamping apparatus 149 is commonly known for HSK tool holder 134, so that clamping jaws 148 are shown only in outline form.

A clamping bar 151, which carries at its lower end a thickened clamping stem 152, extends in an internal bore 150 of spindle 112. Provided in clamping stem 152 is an expanded bore 153, open at the bottom, in whose outer region an internal sealing ring 154 is arranged.

It is evident from FIG. 5 that internal duct 126 extends centeredly in clamping bar 151, and opens into expanded bore 153.

Provided above clamping apparatus 149, between spindle 112 and clamping bar 151, are an upper and a lower seal 156, 157 which are at a distance 158 from one another and have between them an annular space 159, open toward clamping bar 151, which is provided in a wall of internal bore 150 and surrounds clamping bar 151.

Multiple transverse bores 161, three of which are shown in FIG. 5, are provided in clamping bar 151. Flushing ducts 162 extend from annular space 159 first radially to the side and then downward, where they terminate in outlet openings 163 which are arranged in contact surface 157 and discharge flushing streams, indicated at 165, when internal cooling system 121 (FIG. 4) is activated.

In the situation shown in FIG. 5, HSK tool holder 134 is assumed to be clamped into tool receptacle 120, for which purpose it is moved upward in FIG. 5. Internal cooling system 121 is activated at least for a time during this clamping-in operation in order to remove any possible chips from conical external surface 136, annular surface 139, and contact surface 147. Coolant thereby flows into internal duct 126 and emerges at the bottom from clamping stem 152 as flushing stream 131, which is already known from FIG. 4. A portion of the coolant passes via transverse bores 161 into annular space 159 and from there via flushing ducts 162 to outlet openings 163, where it emerges as flushing streams 165. Because of the position of outlet openings 163 in contact surface 147, said flushing streams 165 strike precisely against annular surface 139, so that they effectively remove any adhering chips from it. Dashed arrows 166 designate the sprayed-up coolant which cleans contact surface 147.

As HSK tool holder 134 is moved up into tool receptacle 20, coolant first enters the interior space of HSK tool holder 134, but is discharged again through runoff bores 143. Lastly, coolant tube 141 engages with its thickened head into clamping bar 152, sealing ring 154 ensuring a good seal between clamping bar 152 and coolant tube 141. As coolant tube 141 approaches clamping bar 152 more closely and slides into it, the counterpressure experienced by the coolant in interior duct 126 becomes greater. This counterpressure is the result, in particular, of the fine bores in the tool to be flushed out, which are supplied from bore 132.

This counterpressure now causes increasing quantities of coolant to pass into flushing ducts 162 at increasingly high pressure, so that flushing streams 165 become increasingly stronger and a better and better washing effect is achieved.

When HSK tool holder 134 finally has been pushed entirely into tool receptacle 120, clamping jaws 128 engage behind buttress 140 and pull annular surface 139 into planar contact against contact surface 147, thus determining the position of HSK tool holder 134. In this context, clamping bar 151 is then drawn back so that with its thickened clamping stem 152 it presses clamping jaws 148 outward in known fashion. The linear distance traveled by clamping bar 151 in this context is preferably less than distance 158 between seals 156 and 157, so that during operation with internal cooling, coolant cannot escape between clamping bar 151 and spindle 112. Emergence of coolant through outlet openings 163 is prevented by the immovable planar contact between annular surface 139 and contact surface 147.

Figure 6:
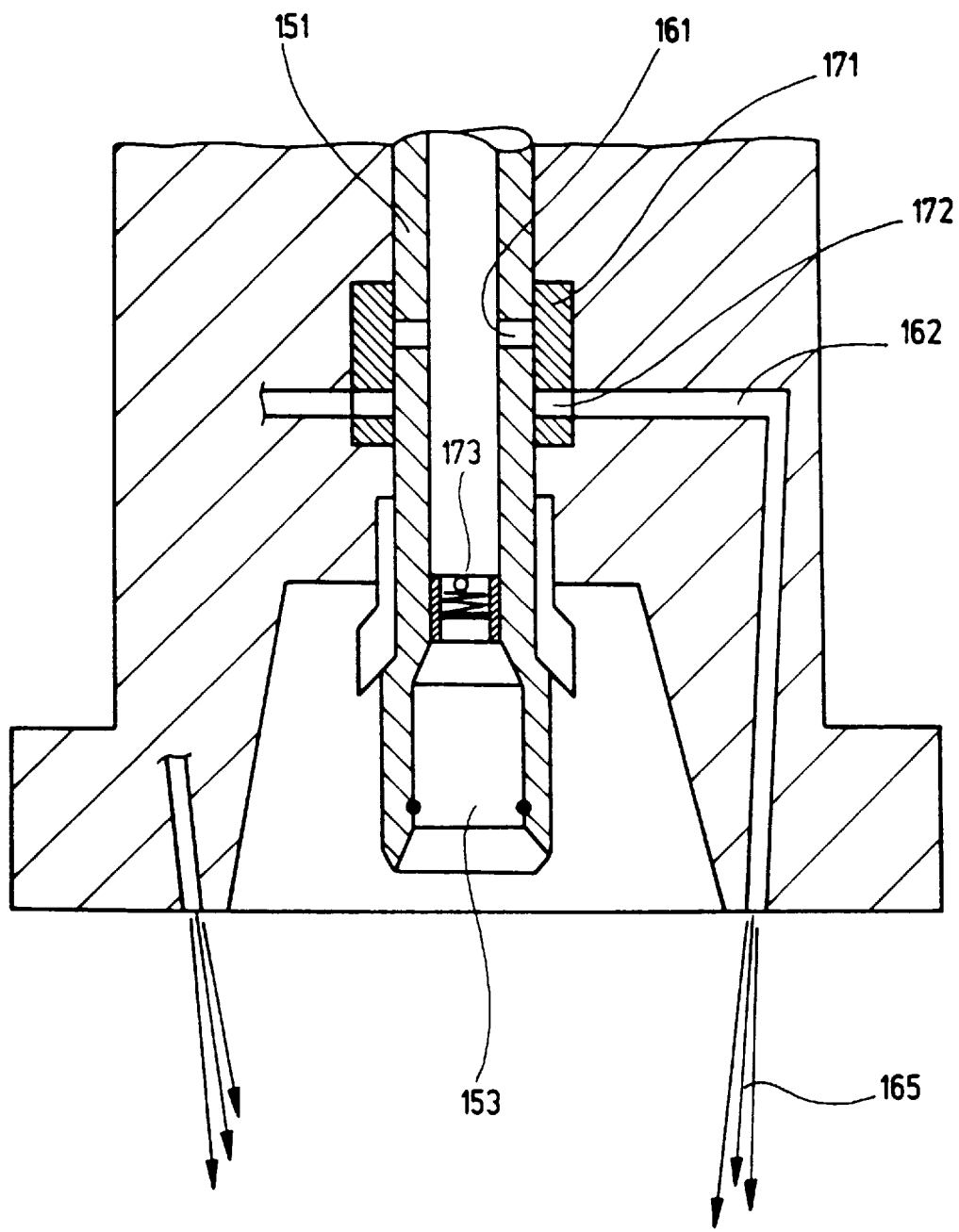
FIG. 6 shows an area of the machine tool shown in FIG. 5, in the region of the clamping bar.

FIG. 6 shows a portion of the machine tool shown in FIG. 5, in a further embodiment in which the bypass through flushing ducts 162 is regulated by means of an axially nondisplaceable shaped bushing or sleeve 171 which surrounds clamping bar 151 in the region of transverse bore 161.

A transverse bore 172, which communicates with transverse bore 161 as a function of the axial position of clamping bar 151, is also provided in shaped bushing 171. More specifically, the two transverse bores 161, 172 are located precisely opposite one another when clamping bar 151 is extended, i.e. the respective tool holder has been uncoupled but may possible still be located in the respective tool receptacle.

When the internal cooling system is then activated, coolant passes through internal duct 126 and transverse bores 161, 172 into flushing ducts 162 and from there onto the tool holder.

Flushing streams 165 are thus released irrespective of activation or deactivation of the internal cooling system, when clamping bar 151 is moved downward.

Also arranged at the lower end of internal duct 126 where it transitions into expanded bore 153 is a nonreturn valve 173 which can also be used in the case of the exemplifying embodiments of FIGS. 1 through 4. Said nonreturn valve 173 allows coolant to pass through only above a certain pressure, e.g. at least 10 bar, so that when the internal cooling system is deactivated, coolant cannot drip out downward. In addition, at a lower pressure, which is established for example by means of motor 122, coolant can arrive at tool holder 118 only via flushing ducts 162 even though the internal cooling system is activated; as a result, under certain conditions a more efficient utilization of coolant becomes possible in cases where coolant emerging downward out of expanded bore 153 would not have a cleaning effect.

Therefore, what We claim, is:

1. A machine tool comprising:
   a spindle having a tool receptacle for receiving tool holders, and an internal duct running longitudinally through said spindle to said tool receptacle,
   a tool changing apparatus for transferring tool holders between their respective magazine position and their working position in said tool receptacle,
   an internal cooling system with a coolant supply to deliver coolant from said coolant supply through said internal duct to a tool holder when clamped into said tool receptacle, in order to supply coolant to a tool holder that is in use, and
   a flushing apparatus connected to the coolant supply and operative to flush a tool holder with coolant while said tool holder is being transferred by said tool changing apparatus,
   wherein the flushing apparatus comprises nozzles, acting predominantly tangentially to the tool holder, to flush in controlled fashion the tool holder on its annular surface.

2. A machine tool, comprising
   a spindle having a tool receptacle for receiving tool holders, and an internal duct running longitudinally through said spindle to said tool receptacle,
   a tool changing apparatus for transferring tool holders between their respective magazine position and their working position in said tool receptacle,
   an internal cooling system with a coolant supply to deliver coolant from said coolant supply through said internal duct to a tool holder when clamped into said tool receptacle, in order to supply coolant to a tool holder that is in use, and
   a flushing apparatus connected to the coolant supply and operative to flush a tool holder with coolant while said tool holder is being transferred by said tool changing apparatus,
   wherein the flushing apparatus comprises nozzles, acting predominantly tangentially to the tool holder, to flush in controlled fashion the tool holder on its annular surface, and
   the nozzles are arranged on the tool changing apparatus.

3. A machine tool as in claim 1, wherein a switchover apparatus is provided which is connected to the coolant supply and connects the coolant supply selectably with the internal cooling system and the flushing apparatus, respectively.

4. A machine tool, comprising
   a spindle having a tool receptacle for receiving tool holders, and an internal duct running longitudinally through said spindle to said tool receptacle,
   a tool changing apparatus for transferring tool holders between their respective magazine position and their working position in said tool receptacle,
   an internal cooling system with a coolant supply to deliver coolant from said coolant supply through said internal duct to a tool holder when clamped into said tool receptacle, in order to supply coolant to a tool holder that is in use, and
   a flushing apparatus connected to the coolant supply and operative to flush a tool holder with coolant while said tool holder is being transferred by said tool changing apparatus,
   wherein the flushing apparatus comprises nozzles, acting predominantly tangentially to the tool holder, to flush in controlled fashion the tool holder on its annular surface, and
   the nozzles are configured on pilot pins for gripper hands provided at said tool changing apparatus for receiving and holding tool holders.

5. A machine tool as in claim 1, wherein the nozzles are arranged on the spindle housing in the region of its end surface.

6. A machine tool as in claim 5, wherein the nozzles are arranged on the end surface.

7. A machine tool, comprising
   a spindle having a tool receptacle for receiving tool holders, and an internal duct running longitudinally through said spindle to said tool receptacle,
   a tool changing apparatus for transferring tool holders between their respective magazine position and their working position in said tool receptacle,
   an internal cooling system with a coolant supply to deliver coolant from said coolant supply through said internal duct to a tool holder when clamped into said tool receptacle, in order to supply coolant to a tool holder that is in use, and
   a flushing apparatus connected to the coolant supply and operative to flush a tool holder with coolant while said tool holder is being transferred by said tool changing apparatus,
   wherein at least one flushing duct, whose at least one outlet opening is arranged in the region of the tool receptacle, branches off from the internal duct,
   there is provided in the spindle, for automatic clamping in of tool holders, a clamping apparatus which comprises a clamping bar, arranged in longitudinally displaceable fashion coaxially with the spindle in an internal bore, through which the internal duct passes in the longitudinal direction and which comes into engagement with a coolant tube of a tool holder when the latter is clamped in, so that it is supplied with coolant through the internal duct, and
   there is provided in the clamping bar at least one transverse bore which opens into the internal duct and coacts with a transfer space, provided in the spindle and open toward the internal bore, into which the flushing duct opens.

8. A machine tool as in claim 1, wherein the pilot pins each have an axially extending delivery bore and a nozzle bore oriented predominantly tangentially or transversely.

9. A machine tool as in claim 1, wherein the nozzles are interconnected via an annular conduit.

10. A machine tool as in claim 1, wherein at least one flushing duct, whose at least one outlet opening is arranged in the region of the tool receptacle, branches off from the internal duct.

11. A machine tool as in claim 10, wherein the flushing duct extends in the spindle.

12. A machine tool as in claim 11, wherein the outlet opening is located in an end face of the spindle.

13. A machine tool as in claim 12, wherein the tool receptacle is designed for tool holders with a hollow-shaft taper (HSK), a contact surface being provided on the end face and, when the HSK tool holder is clamped into the tool receptacle, being in planar contact with its annular surface, so that the HSK tool holder is positioned accurately; and the outlet opening is located in the contact surface.

14. A machine tool as in claim 7, wherein the clamping bar is surrounded by an axially nondisplaceable shaped sleeve in which a transverse bore, which is connected to the flushing duct and with which the transverse bore in the clamping bar communicates as a function of the latter's axial position, is provided.

15. A machine tool as in claim 7, wherein the transfer space is an annular space which extends around the clamping bar.

16. A machine tool as in claim 15, wherein seals which sit between the clamping bar and the spindle are provided above and below the annular space in the internal bore.

17. A machine tool as in claim 16, wherein the distance between the two seals in the longitudinal direction of the clamping bar is greater than a linear distance to be traveled by the clamping bar when clamping in a tool holder.

* * * * *